M. A. POSSONS.
METHOD OF FORMING PIPE TAPS.
APPLICATION FILED DEC. 2, 1915.
1,210,692. Patented Jan. 2, 1917.
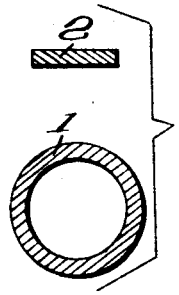
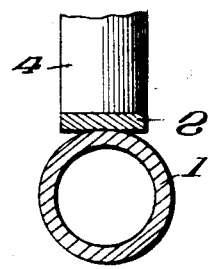
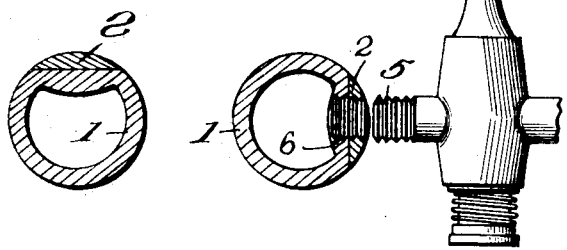
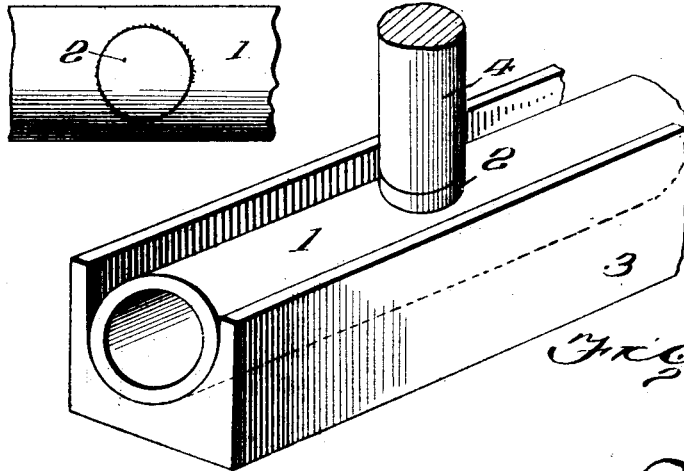
Inventor
M. A. Possons
Witnesses
Floyd R. Cornwall
H. A. Pattison
By A. S. Pattison
Attorney

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

METHOD OF FORMING PIPE-TAPS.

1,210,692.   Specification of Letters Patent.   Patented Jan. 2, 1917.

Application filed December 2, 1915.   Serial No. 64,736.

*To all whom it may concern:*

Be it known that I, MINARD A. POSSONS, a citizen of the United States, residing at Cleveland, in the county of Cuyahoga and State of Ohio, have invented certain new and useful Improvements in Methods of Forming Pipe-Taps, of which the following is a specification, reference being had therein to the accompanying drawing.

My invention relates to improvements in the method of forming pipe taps the object of which is to provide means for making an angular joint with a pipe in an improved manner, whereby the joint made is tight and free from leaks.

My improved method is especially intended for use in making taps in gas pipe where a very tight joint is desired, as in the mains on a gas stove known in the trade as gas stove manifolds.

My improvement is especially adapted to be applied to a pipe which is used on the front of all gas ranges, and into which the gas cocks are screwed. There has been a great deal of difficulty experienced with leaks in such pipes on account of the "poor threads therein," and to overcome this difficulty, my improvement is applicable with entire success.

It is difficult to make a manifold for a gas range which is provided with a good place to attach a gas cock. Heretofore such attachment was made by simply drilling holes into such a manifold, and tapping them, but this only gives one or two full threads unless an extra heavy pipe is used, and also with the use of a lot of nipples and T's in between, the branches of these T's to be used for the cocks. Therefore, due to these numerous connections there has been great difficulty experienced with leaks. Another manner of tapping the manifold has heretofore been, to cast it in one piece with projections for the cocks. This last mentioned way has had many disadvantages as the manifold is very hard to polish after it is cast, and in polishing such a cast manifold, much difficulty has been encountered.

In my present improved method of thickening the pipe by using an iron pipe and attaching my improved form of tap, the tap and pipe are welded together in such a manner that the exterior contour of the pipe is not changed, and therefore, the pipe and tap may be polished, buffed, and nickel-plated without the expense, difficulties and inconvenience experienced with the former above noted methods.

In the accompanying drawings, Figure 1 is a sectional view of the pipe and the reinforcing piece or pallet shown in separated relation to each other. Fig. 2 is a sectional view showing the pipe and reinforcing piece placed together, and the punch in engagement with the latter. Fig. 3 is a sectional view of the pipe and reinforcing piece welded together and showing the displacement of the pipe adjacent the reinforcing piece. Fig. 4 is a sectional view of the united pipe and reinforcing piece after it has been taken from the tumbling barrel which has worn off the corners of the reinforcing piece. Fig. 5 is a sectional view of the pipe and reinforcement shown in Fig. 4 after a hole has been drilled therethrough and then screw-threaded. Fig. 6 is a perspective view showing the pipe within the die, the reinforcing piece in engagement therewith, the punch in contact with the reinforcing piece, and the parts ready to receive the electric current to weld them together. Fig. 7 is a top plan view of Fig. 4.

My improved process of tapping a pipe such as is used for a gas manifold consists in using an iron pipe and a piece of reinforcing metal or pallet such as is illustrated in the drawings, and numbered 1 and 2 respectively. Both the pipe 1 and pallet 2 are first buffed in a tumbling barrel to remove all roughness, scales, etc., to render them in proper condition for the welding process. The pipe is then placed in a trough or receiving die 3 made of copper which is connected with one pole of an electric circuit. After the pipe has been placed in the die 3 a metal pallet is placed upon its upper periphery at one of the points where it is desired to tap the pipe. A copper punch 4, the end of which is the same size as the pallet 2, is then brought down in contact with the said pallet; the punch forms the other electrode being connected with the other pole of the electric circuit.

From the above, it will be seen that the die and punch when brought in contact through the pipe and pallet, closes the electric circuit. When the parts are in the position shown in Fig. 6, the electric current is turned on which causes the pallet 2, and the pipe to become red hot and soft, at which time the punch 4 is moved downwardly forcing the pallet into the pipe, and displacing the pipe on the inside a distance equal to the thickness of the pallet. After the punch has been moved downwardly, the pipe and pallet occupy the positions shown in Fig. 3. The pipe and pallet welded thereto are then placed again in the tumbling barrel which buffs off the projecting corners of the pallet until it conforms substantially with the contour of the pipe as is shown in Fig. 4. The pipe thus reinforced, may be readily polished and nickel-plated for its contour is not changed, and none of the difficulties heretofore existing will be experienced. After the pipe has been finally polished and nickel-plated, a hole is drilled through the pallet and pipe, and provided with an internal screw-thread 6 as is shown in Fig. 5. This screw-threaded opening is adapted to receive the screw-threaded end 5 of a gas cock. After the parts have been finished, as is shown in Fig. 4, the pallet may be easily located in order to ascertain the point at which to drill the hole because the pallet may be seen in the pipe as is shown in Fig. 7.

From the above, it will be seen that by my improved process, a pipe having a thin wall is thickened at desired points, thereby providing sufficient screw threads in order to make a tight joint. This thickening of the pipe, however, does not change the outside contour of the pipe, but leaves it the same as before, whereby no difficulties are encountered in polishing and nickel-plating it. The amount of pipe displaced on the inside is so little, that it is not enough to at all impede or lessen to any material extent, the flow of gas through the manifold, through the cock, and thence to the burners.

Having thus fully described my invention what I claim and desire to secure by Letters Patent is:

1. The method of providing a surface with a welded reinforcing piece with the outer surface of the piece approximately even with the outer face of the said surface, consisting in placing the reinforcing piece on the surface and subjecting the reinforcing piece and the surface to a welding heat and while so subjected to said heat simultaneously depressing the surface and forcing the piece into the depression and welding the parts together, thereby simultaneously effecting the complete result in one operation for the purpose described.

2. The method of providing a pipe with a welded reinforcing piece with the outer surface of the piece approximately even with the outer contour of the pipe, consisting in placing a flat reinforcing piece on the outer surface of the pipe and subjecting the piece and the adjacent surface of the pipe to a welding heat to soften the pipe and piece and while so subjected to said heat simultaneously depressing the pipe and welding the piece in the depression, whereby the piece is simultaneously depressed into the pipe and welded thereto in a single operation, and finally finishing off the corners of the flat piece so as to make it conform with the contour of the pipe.

In testimony whereof I hereunto affix my signature in the presence of two witnesses.

MINARD A. POSSONS.

Witnesses:
J. K. MOORE,
H. A. PATTISON.

Copies of this patent may be obtained for five cents each, by addressing the "Commissioner of Patents. Washington, D. C."